June 28, 1966  H. HORNSCHUCH ET AL  3,257,807
POWER PLANT CONTROL SYSTEM
Filed Jan. 13, 1964                                   2 Sheets-Sheet 1

INVENTORS
HANNS HORNSCHUCH
JACK R. WEBB
BY
David W. Tilhott
ATTORNEY

INVENTORS
HANNS HORNSCHUCH
JACK R. WEBB

3,257,807
POWER PLANT CONTROL SYSTEM

Hanns Hornschuch, Easton, and Jack R. Webb, Bethlehem, Pa., assignors to Ingersoll-Rand Company, New York, N.Y., a corporation of New Jersey
Filed Jan. 13, 1964, Ser. No. 337,191
3 Claims. (Cl. 60—39.24)

The invention relates to automatic control systems for power plants utilizing jet airplane engines as gas generators. This invention is particularly desirable for use with the power plant arrangement disclosed in the patent application invented by Hanns Hornschuch, Serial No. 220,525, filed August 30, 1962, now U.S. Patent No. 3,172,257.

The principal object of this invention is to provide an automatic control system for a power plant of the type disclosed in the above-mentioned patent application, Serial No. 220,525, and utilizing a plenum chamber with multiple jet engines discharging hot gases into the plenum chamber and multiple power units being driven by the gases supplied by the plenum chamber.

Earlier power plants using multiple gas generators driving multiple power units have been controlled by a system in which it was necessary to increase or decrease the speed or power of the power units identically and simultaneously. The speed and power of one power unit could not be varied independently of the other power units.

An important object of this invention is to provide a power plant control system wherein the speed and power of each power unit can be varied independently of the other power units.

The invention is described in connection with the accompanying drawings wherein:

FIG. 1 is a simplified perspective view of the power plant arrangement which the control system of this invention is particularly adapted to be used with;

Figure 1:
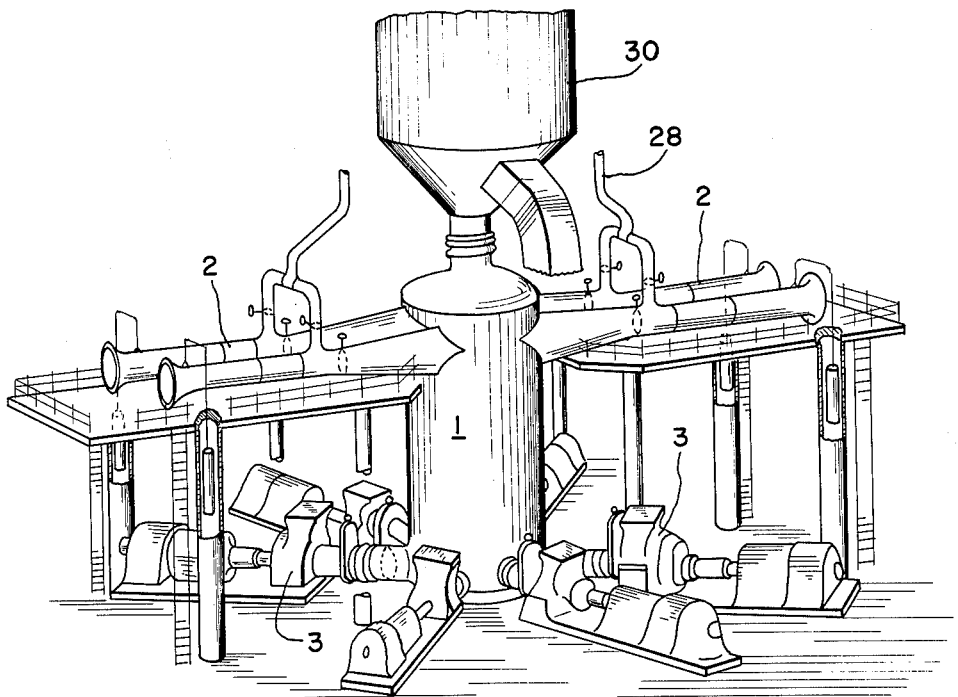

The control system of this invention is particularly adapted for use with the type of power plant shown generally in FIG. 1. Basically, this power plant includes a plenum chamber or hot gas container 1, a plurality of airplane-type jet engines 2 mounted on and discharging hot gases into the plenum chamber 1, and a plurality of power units 3, which may be gas turbines, connected to the plenum chamber 1 and driven by hot gases from the plenum chamber. Each jet engine 2 is conventional and includes a compressor 4, a combustion chamber 5, a turbine 6 driving the compressor 4, and a hot gas discharge outlet 7. Each power unit or gas turbine 3 shown in the drawings includes a turbine wheel 8 and a hot gas inlet 9 containing a set of variable area nozzles 10 for controlling and varying the amount of hot gas admitted to the power unit 3. This power plant arrangement is more specifically disclosed in the earlier filed patent application of Hanns Hornschuch, Serial No. 220,525, filed August 30, 1962.

Figure 2:
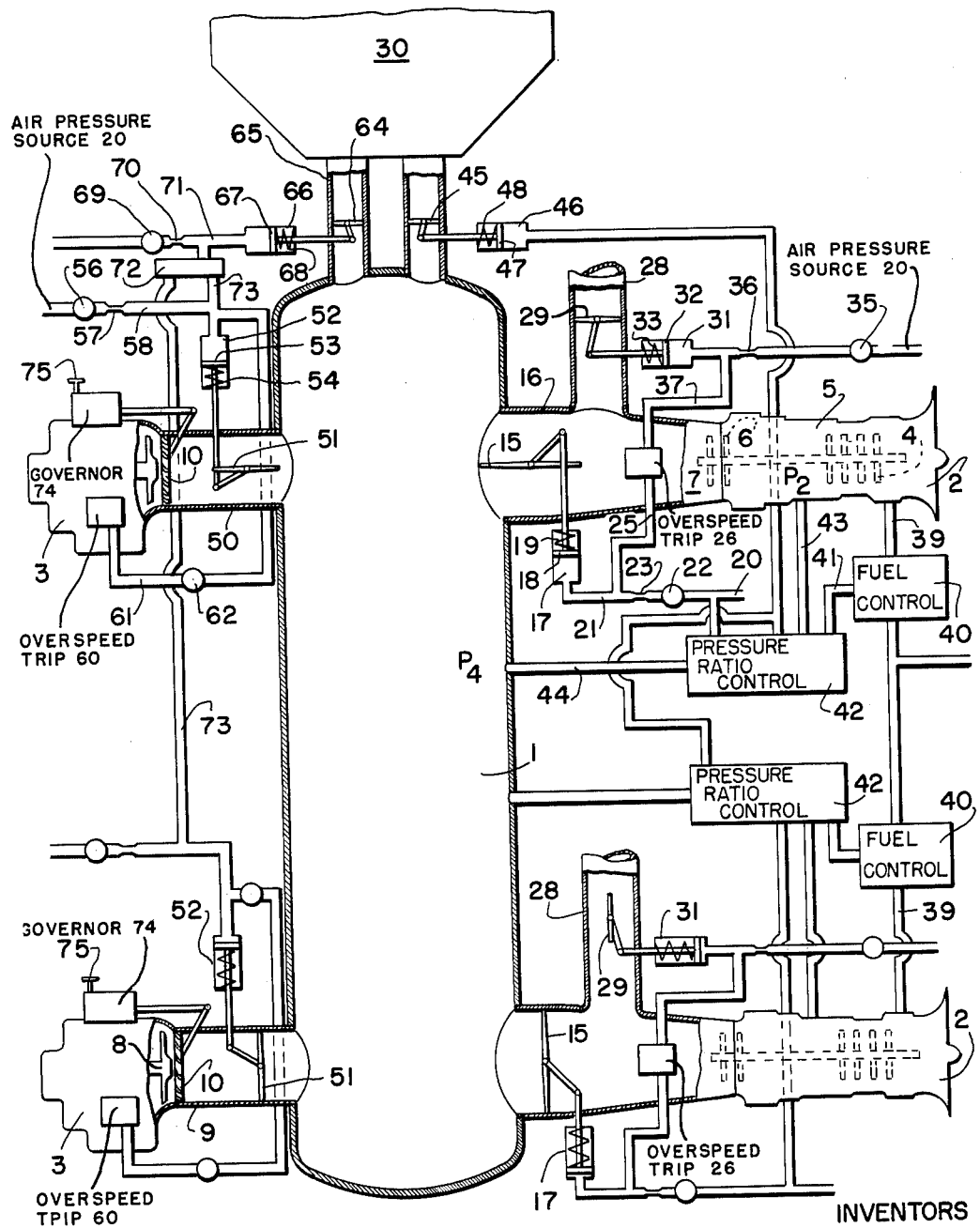
FIG. 2 is a diagrammatic view of the control system of this invention.

The control system is broadly and diagrammatically shown in FIG. 2. For description purposes, this system is divided into two sections, termed the "gas generator section" and the "power unit section." The "gas generator section" generally involves the portion of the system controlling the jet engines 2 and the "power unit section" is the portion of the system controlling the power units 3.

Gas generator section

The controls for a single gas generator or jet engine 2 are described below. It will be understood that, generally, these controls will be duplicated for each gas generator in the power plant. These controls include a main butterfly valve 15 pivotally mounted in the main conduit 16 between the discharge outlet 7 of the jet engine 2 and the plenum chamber 1. The main valve 15 is movable between alternate positions closing or opening the conduit 16. The valve 15 is moved between its open and closed positions by a fluid motor cylinder 17 containing a reciprocating piston 18 which is interconnected to the valve 15 by a suitable linkage. A spring 19 in the cylinder 17 biases the piston 18 in a direction closing the valve 15 and the cylinder 17 is arranged to receive air pressure to move the valve 15 to the open position. If the air pressure in the cylinder 17 is released, the spring 19 automatically closes the valve 15.

The cylinder 17 is connected to an air pressure source 20 by an air pressure line 21 containing a valve 22 and a limited area orifice 23. The valve 22 is opened manually to supply air pressure through the orifice 23 to the cylinder 17. When the main valve 15 is closed, it can be opened slowly by opening the valve 22 slowly, thus supplying air pressure to the cylinder 17 slowly.

When the main valve 15 is open, it can be quickly closed by venting the air pressure from the cylinder 17 by means of the dump line 25. This line 25 is connected at one end to the air line 21 between the cylinder 17 and the orifice 23 and can be connected at the other end to various devices which will automatically vent the line 25 upon the occurrence of a variety of abnormal or dangerous operating conditions of the jet engine 2. For example, these abnormal conditions may include excessive speed, excessive temperature, and low lube oil pressure. The drawings show an overspeed trip device 26 mounted on the jet engine 2 and connected to the dump line 25. If the speed of the engine 2 rises to an excessive value, the device 26 opens the dump line 25.

The gas generator 2 is further provided with an exhaust or vent conduit 28 containing a pivoted butterfly valve 29 for exhausting the hot gas from the engine to atmosphere through a chimney 30 when the main valve 15 is closed. The valve 29 is connected to and operated by a fluid motor cylinder 31 containing a piston 32 and a spring 33. The spring 33 biases the piston 32 in a direction moving the valve 29 to the open position and the application of air pressure to the cylinder 31 moves the valve 29 to the closed position. Removal of the air pressure from the cylinder 31 causes the valve 29 to automatically open.

The vent valve cylinder 31 receives air pressure from the air source 20 through a valve 35 and an orifice 36. The opening of the valve 35 applies air pressure to the vent valve cylinder 31 and causes it to close the vent valve 29. A dump line 37 is connected to the cylinder 31 between it and the orifice 36 so that the opening of the dump line 37 releases air pressure on the cylinder 31 and causes it to open the vent valve 29.

When the jet engine 2 is initially started, the main valve 15 is closed and the valve 29 is open. After the engine is running normally, the valve 15 is initially cracked or slightly opened to pressurize the chamber 1. When the pressure in the plenum chamber 1 rises to substantially its normal value, the valve 15 is fully opened and the valve 29 is closed.

Fuel is fed to the jet engine 2 by means of a fuel line 39 and a variable fuel regulator 40. The fuel regulator 40 is conventional and is controlled by a variable pressure air signal fed through the signal line 41.

The signal line 41 is connected to a pressure ratio control 42. The pressure ratio control 42 receives the discharge pressure $P_2$ of the jet engine compressor 4 through the air line 43 and the pressure $P_4$ in the plenum chamber 1 through an air line 44. As a result of receiving these two pressures, the pressure ratio control 42 generates a pneumatic pressure signal which is a mathematical function of the ratio of the compressor discharge pressure $P_2$ divided by the plenum chamber pressure $P_4$.

This pneumatic signal $P_2/P_4$ is fed to the signal line 41 running to the fuel regulator 40. It will be understood that $P_2/P_4$ may be either the true ratio of $P_2$ divided gy $P_4$ or a value which varies as some function of the true ration.

The pressure ratio control 42 also controls the opening of a relief valve 45 mounted in the top of the plenum chamber 1. The relief valve 45 vents the exhaust pressure from the plenum chamber 1 to the chimney 30 and is operated by an air cylinder 46 having a piston 47 and a spring 48 which normally biases the valve 45 open. Air pressure from the pressure ratio control 44 is fed to the cylinder 46 by means of the air line 49. The cylinder 46 is calibrated to close the valve 45 completely at an air pressure signal corresponding to the minimum desired $P_2/P_4$ of the jet engine 2 and to open if the $P_2/P_4$ drops below the minimum desired value. In other words, the valve 46 will open when the power output of the jet engine 2 rises above the value at which it is desirable for the jet engine to operate and will remain closed so long as the power output of the jet engine remains below the maximum desired value. The opening of the valve 45 decreases the pressure in the plenum chamber 1 until the jet engine decreases its power by means of the ratio control 42, in order to maintain the proper pressure in the plenum chamber. In comparing the power output of the jet engine to the ratio $P_2/P_4$, it will generally be true that $P_2/P_4$ drops as the power output increases $P_2/P_4$ drops as $P_4$ increases). Only one vent valve is necessary for all jet engines 2 provided that it is large enough to properly exhaust the plenum chamber 1 when all the jet engines are running.

Figure 3:
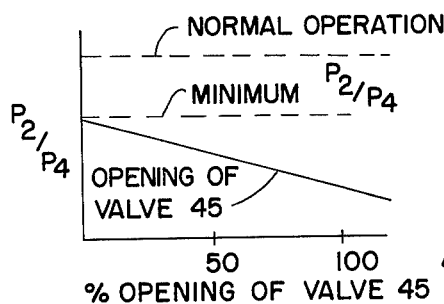
FIG. 3 is a curve illustrating a part of the operation of the control system.

FIG. 3 is a curve illustrating the opening of the valve 45 in relation to the $P_2/P_4$ ratio. The vertical ordinate represents the $P_2/P_4$ ratio and the horizontal ordinate represents the percent opening of the valve 45. The two horizontal dotted line curves show the normal operating point of $P_2/P_4$ and the minimum desired operating point of $P_2/P_4$. If $P_2/P_4$ drops below the minimum value of $P_2/P_4$, the valve 45 begins to open to exhaust some of the pressure in the plenum chamber 1. At the same time, the ratio controller 42 will be telling the jet engine or engines to reduce their power output which will automatically reduce $P_4$ and increase the ratio $P_2/P_4$.

The pressure ratio control 42 is connected to and receives air pressure from the air source line 20 for use in creating its air signal. Several different types of pneumatic control devices may be used as the control 42. One mechanism which will accomplish this job is the Sorteberg Force Bridge, which is a type of pneumatic pressure multiplier and divider well known to people in the pneumatic signal art.

*Power unit section*

As in the case of the gas generators, each power unit 3 has a set of controls which generally is duplicated for each power unit 3. Each power unit 3 is connected to the plenum chamber 1 by a conduit 50 containing a pivoted butterfly valve 51 which can open or close the conduit 50. The valve 51 is operated by a single-acting fluid motor cylinder 52 containing a piston 53 and a spring 54 urging the piston 53 in a direction to close the valve 51. Application of air to the cylinder 52 causes it to open the valve 51. Air pressure is supplied to the cylinder 52 from the air source 20 through an air valve 56 and a limited area orifice 57 and an air line 58.

The air pressure in the cylinder 52 can be quickly vented by exhausting a dump line 61 connected to the air line 58 between the orifice 57 and the cylinder 52. Various devices can be connected to the dump line 61 to vent it and close the valve 51 if an abnormal operating condition should arise. The drawings show an overspeed trip device 60 connected to the dump line 61. Other devices might be connected to the dump line 61 to exhaust it, for example, if the lube oil pressure in the lower unit 3 fails or if its operating temperature rises too high. The dump line 61 contains a valve 62 to shut the line 61 during the starting of the power unit 3 whereby the butterfly valve 51 can be opened before the power unit comes up to normal speed.

A pivoted butterfly valve 64 is located in a vent conduit 65 connecting the plenum chamber 1 to the chimney 30. The valve 64 serves all the power units 3 and is not duplicated as is the case with the remainder of the control system for the power unit section. The valve 64 opens simultaneously with the closing of the valve 51 feeding the power unit 3. Thus, the pressure in the plenum chamber 1 will not rise suddenly when the valve 51 closes.

The butterfly valve 64 is operated by an air cylinder 66 containing a piston 67 and a spring 68. The spring 68 urges the piston 67 in a direction to open the valve 64 and air pressure is applied to the air cylinder 66 to close the valve 64.

Air pressure is supplied to the air cylinder 66 from the air source 20 through a valve 69, an orifice 70, and an air line 71. The air line 71 is also connected to an automatic dump valve 72 which opens to vent the air line 71 in response to the exhausting of a cylinder 52 of any of the power units 3. Each cylinder 52 is connected to the dump valve 72 by a signal line 73. If the cylinder 52 is vented by the dump line 61, the loss in pressure is transmitted by the line 73 to the valve 72 which opens and dumps the cylinder 66.

An automatic governor 74 is mounted on the power unit 3 to control the variable nozzles 10 in response to the speed of the power unit 3. The governor 74 continuously measures the speed of the power unit and automatically adjusts the variable nozzles 10 to maintain a predetermined selected speed. The governor 74 includes a knob 75 for setting it to the selected speed to be maintained. If desired the speed selector knob can be controlled from a remote station by means of appropriate servo and slave units.

*Operation*

We assume that prior to starting the power plant, the valves 45 and 64 on the plenum chamber 1 are open, the valve 15 of each jet engine 2 is closed and the valve 29 of each jet engine is open. In addition, the valve 51 of each power unit 3 is closed.

Initially, a jet engine 2 is started in a conventional manner and its hot gases are discharged through the valve 29 and the stack 30. After the jet engine is operating normally, the valve 15 is slightly opened to fill the plenum chamber 1 with hot gas and to bring its pressure up to near normal pressure. Previously, the valves 64 and 45 will have been closed under the control of an operator so that the plenum chamber can retain the hot gas under pressure.

After the plenum chamber 1 is pressurized sufficiently, the valve 15 is opened fully and the vent valve 29 is closed. Since none of the power units 3 are operating yet, the increased flow of gas into the plenum chamber will increase the plenum chamber pressure $P_4$ and cause the ratio control 42 to open the valve 45 which will vent the plenum chamber 1 and, as a result, prevent the pressure in the chamber 1 from rising too high for safety.

At this time, one of the power units 3 can be started by opening its valve 51 manually, by admitting air pressure to the motor cylinder 52. After the power unit 3 comes up to speed, it is placed under control of its governor 74 which controls the variable nozzles 10 to maintain the speed of the power unit at a predetermined value.

Thereafter additional power units 3 and jet engines 2 can be started, depending on the need. For example, if three power units 3 are operating and only two jet engines 2 are necessary to supply enough hot gas for three power units, it is only necessary to run two jet engines. Hence, the number of jet engines operating will be determined by the quantity of hot gas which is needed.

If a jet engine overspeeds, or otherwise operates improperly, a sensor as 26 will exhaust the dump line 37 and cause the valve 15 to close simultaneously with the opening of the valve 29.

If a power unit 3 develops an improper operating condition such as overspeed, a sensor, such as the sensor 60, will respond to the improper operating condition and exhaust the dump line 61 to close the valve 51 and simultaneously open the valve 64. Thus, the power unit will be automatically isolated from the plenum chamber 1 and the open valve 64 will prevent the hot gas pressure in the plenum chamber from rising to an undesirable value.

Although a preferred embodiment of the invention is illustrated and described in detail, it will be understood that the invention is not limited simply to this embodiment, but contemplates other embodiments and variations which utilize the concepts and teachings of this invention.

Having described our invention, we claim:

1. In a power plant having an airplane jet engine including a compressor and a plenum chamber receiving the exhaust of the jet engine, the combination comprising:
   (a) a fuel control device for varying the fuel flow to the jet engine in response to a signal;
   (b) a pressure ratio controller adapted to receive the pressure of the air discharged from the jet engine compressor and the pressure of the gas in the plenum chamber and to generate a signal which is a mathematical function of the ratio of the compressor discharge pressure divided by the plenum chamber pressure; and
   (c) means for transmitting this signal to the fuel control device to vary the amount of fuel fed to the jet engine.

2. The combination of claim 1 including:
   (a) a vent valve on the plenum chamber operative to vent gas from said plenum chamber when the pressure in said chamber is excessive; and
   (b) said vent valve being responsive to the signal generated by the ratio control.

3. In a power plant having a combustion gas generator discharging into a plenum chamber and a turbine connected to the chamber, an automatic control system comprising:
   (a) adjustable means for varying the amount of combustion gas flowing to the turbine from the plenum chamber;
   (b) means for varying said adjustable means in response to the speed of the gas turbine whereby the turbine maintains a predetermined selected speed; and
   (c) means for controlling the gas generator to vary its gas output in response to the gas being exhausted from the plenum chamber whereby the gas output of said gas generator will follow a change in the amount of gas flowing to said turbine.

References Cited by the Examiner

UNITED STATES PATENTS

| | | | |
|---|---|---|---|
| 2,049,078 | 7/1936 | Otis | 60—62 |
| 2,371,889 | 3/1945 | Hermitte | 60—39.15 X |
| 2,922,050 | 1/1960 | Loughran | 60—39.25 X |
| 3,037,348 | 6/1962 | Gassmann | 60—39.16 |
| 3,068,647 | 12/1962 | Santamaria et al. | 60—39.25 |

JULIUS E. WEST, *Primary Examiner.*